United States Patent
Cha et al.

(10) Patent No.: US 8,489,698 B2
(45) Date of Patent: Jul. 16, 2013

(54) APPARATUS AND METHOD FOR ACCESSING A METADATA

(75) Inventors: Myung-Hoon Cha, Daejeon (KR); Hong-Yeon Kim, Daejeon (KR); Young-Kyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 183 days.

(21) Appl. No.: 12/968,980

(22) Filed: Dec. 15, 2010

(65) Prior Publication Data

US 2011/0153769 A1  Jun. 23, 2011

(30) Foreign Application Priority Data

Dec. 18, 2009 (KR) .................. 10-2009-0127072
Mar. 15, 2010 (KR) .................. 10-2010-0023033

(51) Int. Cl.
*G06F 15/16* (2006.01)
*G06F 7/00* (2006.01)

(52) U.S. Cl.
USPC ............. 709/208; 709/229; 707/E17.055; 707/679

(58) Field of Classification Search
None
See application file for complete search history.

(56) References Cited

U.S. PATENT DOCUMENTS

| | | | | |
|---|---|---|---|---|
| 7,237,027 | B1 * | 6/2007 | Raccah et al. | 709/226 |
| 7,921,083 | B2 * | 4/2011 | Komori et al. | 707/679 |
| 2004/0122917 | A1 * | 6/2004 | Menon et al. | 709/219 |
| 2007/0078809 | A1 | 4/2007 | Semkow et al. | |
| 2007/0214175 | A1 * | 9/2007 | Mitaru | 707/104.1 |
| 2007/0299884 | A1 | 12/2007 | Komori et al. | |
| 2009/0112921 | A1 * | 4/2009 | Oliveira et al. | 707/103 R |
| 2009/0210640 | A1 | 8/2009 | Davis | |
| 2010/0169595 | A1 * | 7/2010 | Bryant-Rich | 711/162 |

* cited by examiner

*Primary Examiner* — Wen-Tai Lin
(74) *Attorney, Agent, or Firm* — Kile Park Reed & Houtteman PLLC

(57) ABSTRACT

Provided are an apparatus and a method for acquiring a consistent result even if one client accesses any metadata server in a circumstance that the cluster configuring many metadata servers exist. The apparatus as mentioned above includes a deletion file list unit that stores information about a deleted metadata during a predetermined period; and a metadata server selector that selects a metadata server to receive a operation request about a metadata among a plurality of metadata servers based on information from the deletion file list unit.

8 Claims, 5 Drawing Sheets

US 8,489,698 B2

APPARATUS AND METHOD FOR ACCESSING A METADATA

CROSS REFERENCE TO RELATED APPLICATIONS

This application claims priority to Korean Patent Application No. 10-2009-0127072 filed on Dec. 18, 2009 and Korean Patent Application No. 10-2010-0023033 filed on Mar. 15, 2010, the entire contents of which are herein incorporated by reference.

BACKGROUND OF THE INVENTION

1. Field of the Invention

The present invention relates to an apparatus and a method for accessing a metadata, and more particularly, to an apparatus and a method for consistently accessing the same contents that are being asynchronously copied to several computers.

2. Description of the Related Art

The storage system, in which many computers are connected in a network, and then some computers among them store a metadata, while the rest of the computers store data, can be used for mass data storage under the Internet environment.

Under the storage system environment, a client acquires actual data by firstly finding a particular data server storing data that is required through the metadata server check, in which the metadata server stores the metadata, and then accesses the data server.

When one of metadata servers is operated in the storage system that store mass data, requests from many clients is concentrated in one of the metadata servers. As a result, there is a bottleneck phenomenon, such that performance of operation is degraded.

Therefore, operating clusters of many metadata servers in the large-scale storage system has processed the clients' requests to have scalability.

Each of the metadata servers configuring the metadata servers' clusters stores the same metadata. Even if a client accesses any metadata server, the client can acquire the metadata related to the required data.

However, there is a synchronizing problem of metadata servers for maintaining the metadata servers that store the same metadata. Specifically, the contents that are stored by each of the metadata servers become show a disagreement within a certain period until identically storing newly generated metadata into all the metadata servers.

In this case, if a client accesses the metadata server that is randomly selected in order to increase the scalability of the metadata processing, the case, in which the client cannot find a desired metadata, can be caused. In other words, it can be possible that the data just generated cannot be found. Meanwhile, on the contrary of this, it can be possible that a client misjudges that the data just deleted exists.

U.S.A. Patent Laid-Open Publication No. 2007/0078809 A1 discloses a method for managing and using data storage that is dispersed. The patent application discloses using a peer-to-peer way in order to secure high serviceability for supplying data to a user. If a client asks a file, the system calculates the location that stores the file, and then finds the closest source for acquiring the file. After a client receives the file from the relevant source, the client copies the file to himself or herself. As a result, a client can immediately use the file for a further quick search, and the copied file also functions as a source that can be supplied to other clients. The patent application discloses a method for increasing data serviceability. However, there is not a specific process for supplying the consistent results to a client in a circumstance that the same contents are asynchronously copied to many servers.

U.S.A. Patent Laid-Open Publication No. 2009/0210640 A1 discloses a method for eliminating data duplication and increasing efficiency of a reading operation in a circumstance when a plurality of storages exist. The patent application discloses a file configuring a plurality of blocks. In a circumstance when a plurality of files is stored, when the blocks having the same contents with an already existing block are stored, it may be attempted that the data duplication can be solved by maintaining point information indicating that the existing blocks having the same contents instead of delicately storing the same file. In addition, when searching the desired file from the data storage, the search order should be selected based on the physical location between the blocks configuring the file, and then if the same block with the block to be now read is already loaded in a buffer, it should not be read. The patent application discloses a method for efficiently reading when existing in the same blocks, but does not disclose a method for supplying consistent results to a client in a circumstance that the blocks having the same contents are copied.

SUMMARY OF THE INVENTION

The present invention has been made in an effort to provide an apparatus and a method for acquiring a consistent result even if a client accesses any metadata servers in a circumstance that the cluster configuring many metadata servers exists.

Further, the present invention has been made in an effort to maintain the scalability of the metadata operation that is firstly intended by the metadata server cluster by supplying a protocol of metadata processing that allow to normally operate a general application program of a client by the metadata server cluster having a master-slave structure, despite a restriction due to asynchronously copying metadata.

An exemplary embodiment of the present invention provides an apparatus for accessing the metadata including: a deletion file list unit that stores information about deleted metadata during a predetermined period; and a metadata server selector that selects a metadata server to receive an operation request about metadata among a plurality of the metadata servers based on information from the deletion file list unit.

The predetermined period is longer than the period, in which the information about the deleted metadata is shared to the plurality of the metadata servers.

The operation request includes a metadata check request.

The metadata server selector selects a metadata server to receive the operation request according to whether or not the relevant metadata to be checked is deleted when requesting the metadata check.

The plurality of the metadata servers comprise one master metadata server and a plurality of slave metadata servers.

The metadata server selector selects the master metadata server and transmits the metadata check request when the relevant metadata is deleted.

The metadata server selector selects one of the slave metadata servers and transmits the metadata check request when the relevant metadata is not deleted.

The metadata server selector selects the master metadata server and transmits again the metadata check request when the answer, in which the relevant metadata does not exist, is received from the selected slave metadata server.

Another exemplary embodiment of the present invention provides a method for accessing a metadata including: storing information about a deleted metadata referring to a deletion file list unit during a predetermined period; and selecting a metadata server to receive an operation request about a metadata based on information from the deletion file list unit among a plurality of metadata servers by a metadata server selector.

The predetermined period is longer than the period, in which the information about the deleted metadata is shared to the plurality of the metadata servers.

The operation request includes a metadata check request.

The selecting the metadata server selects a metadata server to receive the operation request according to whether or not the relevant metadata to be checked is deleted when requesting the metadata check.

The plurality of the metadata servers comprise one master metadata server and a plurality of slave metadata servers.

The selecting the metadata server selects the master metadata server among the plurality of metadata servers and transmits the metadata check request when the relevant metadata is deleted.

The selecting the metadata server selects any slave metadata server among the slave metadata servers and transmits the metadata check request when the relevant metadata is not deleted.

The selecting the metadata server selects the master metadata server and transmits again the metadata check request when the answer, in which the relevant metadata does not exist, is received from the selected slave metadata server.

According to the exemplary embodiments of the present invention, a client can recognize deleting the relevant metadata in a circumstance when the same information from the master metadata server to the slave metadata server about the deleted metadata is not synchronized.

In addition, a client can exactly distinguish the relevant metadata in a circumstance when the same information from the master metadata server to the slave metadata server about the inserted metadata is not synchronized.

DETAILED DESCRIPTION OF THE PREFERRED EMBODIMENTS

Hereinafter, an apparatus and a method for accessing metadata according to an exemplary embodiment of the present invention will be described below with reference to the accompanying drawings. Before the detailed description of the present invention, the terms or words used in the description and the claims of the present invention that will be described below should not be interpreted to limit within the general or dictionary means. Therefore, the configuration as depicted in the exemplary embodiments and the drawings of the present invention is just the most preferable embodiment of the present invention, and does not represent all the technical spirit of the present invention, so that it should be understood that there can be various equivalents and modifications that can be alternatively changed with the present invention at the time of submitting the present invention.

Figure 1:
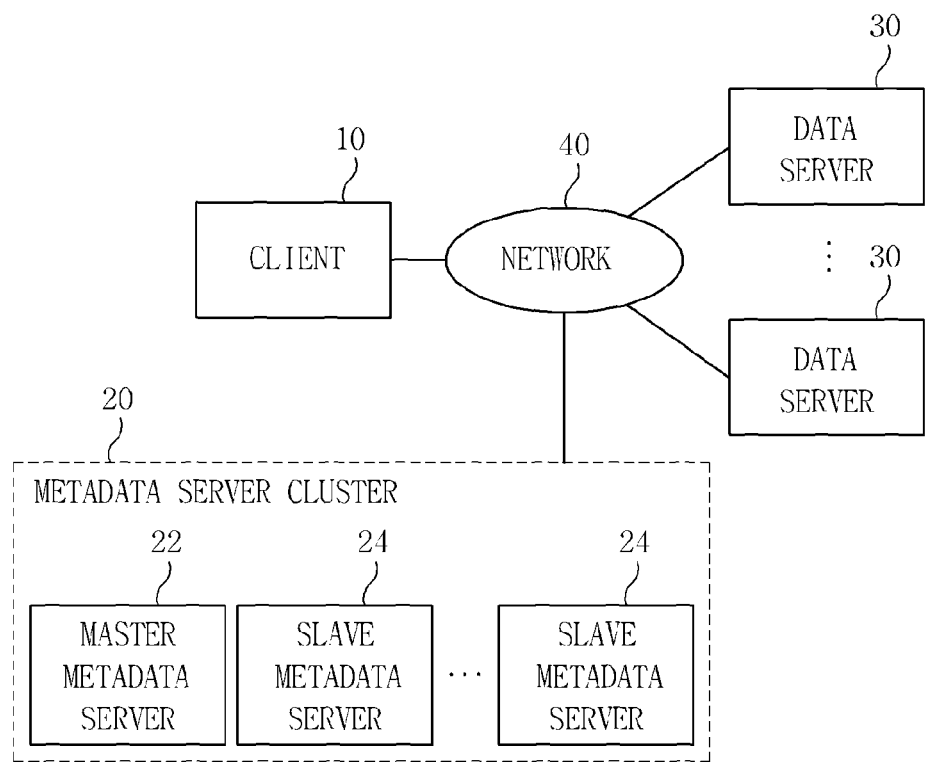
FIG. 1 is a diagram showing an example of a storage system that is applied in the present invention.

FIG. 1 is referred for a description of the technical feature of the present invention as mentioned above.

A general metadata server cluster 20 is configured of one master metadata server 22 and a plurality of slave metadata servers 24. The operation for generating and deleting a metadata is transmitted to the master metadata server 22, and processed. The operation for checking a metadata is transmitted to the slave metadata servers 24, and processed.

The content of the master metadata server 22 is asynchronously copied to a plurality of slave metadata servers 24. Therefore, the metadata that is newly generated or deleted in the master metadata server is reflected to the all slave metadata servers after a predetermined period.

There are two types of problems when the metadata processing protocol of the present invention is not reflected in the general data storage system.

As a first example, if the application program, such as a kind of vi editor, is performed in order to mount the general storage system as mentioned above in a client 10, and editing a file on the storage system mounted in the client, a series of internal operations, such as generation, deletion, or checking of a temporary file, are repeated. A metadata is generated, deleted, and checked during the process. To achieve this, the client 10 sends the request to the master metadata server 22 or the slave metadata servers 24. In this case, due to the problem of asynchronous copying, the response of the master metadata server 22 and the slave metadata servers 24 disagree, such that a follow-up operation of a normal program becomes impossible. And, in the case of vi, the editing operation is going down by force.

For example, when the order of "vi file1" in the client 10 is performed, vi performs additional processing, such as the generation, deletion, and checking of a temporary file, i.e., ".file1.swp." In other words, a plurality of requests in the client 10 are transmitted to the metadata server 22 and 24, and processed, as Metadata_check (.file1.swp)→Metadata_check (.file1.swp)→Metadata_generation (.file1.swp)→ Metadata_check (.file1.swp)→Metadata_deletion (.file1.swp)→Metadata_check (.file1.swp), and the like.

However, there is an error in "other program edits the swp file having the same name" such that the normal operation can not be performed no longer, in a circumstance when Metadata_check ( )operation is transmitted to the slave metadata servers 24, and then Metadata_generation ( ) and Metadata_deletion ( )operation is transmitted to the master metadata server 22.

The reasons are the process, in which ".file1.swp" file is generated in the master metadata server 22 according to Metadata_generation (.file1.swp) operation, then the file is deleted by performing Metadata_deletion (.file1.swp) operation, and then again whether or not ".file1.swp" exists is confirmed. In the flowchart, the final Metadata_check (.file1.swp) operation is transmitted to the slave metadata server 24. In this case, the slave metadata servers 24 do not yet receive the condition about ".file1.swp" just deleted from the master metadata server 22. This causes that the relevant slave metadata servers 24 to transmit the response, the file already exists, to the client 10 about the request of Metadata_check (.file1.swp). For this reasons, vi sends the message, in which another person is editing the same file, to allow the normal editing operation to be stopped.

The application programs on the client, which have the processing flowchart as mentioned above, variously exist in addition to vi.

A second example has a directly opposite idea. It is the case when a directory is generated on the storage system mounted in the client 10. For example, when the order of "mkdir dir1" is performed in the client 10, the request in a type of Metadata_generation (dir1)→Metadata_check (dir1) is transmitted to the metadata servers 22 and 24. For this reason, the master metadata server 22 generates a metadata about "dir1" by the request of Metadata_generation (dir1). However, when Metadata_check (dir1) operation is requested to the slave metadata servers 24, the slave metadata servers 24 respond that there is no metadata about dir1, such that mkdir operation has failed by generating an error in the middle of the operation. This is because the contents of dir1 metadata newly generated in the master are not copied in the slave metadata servers 24.

The two examples as mentioned above show that the processing flow commonly generated with regard to the metadata operation in a plurality of application programs can be improperly operated in the metadata server cluster 20 having the master-slave structure.

Therefore, the present invention is technically characterized as maintaining the scalability of a metadata operation that is firstly intended by the metadata server cluster, by supplying a metadata process protocol to be normally operated in the general application program of the client, although the metadata server cluster having the master-slave structure is limited due to the asynchronous copy of the metadata.

An example of the storage system that is applied in the present invention will be described with reference to FIG. 1.

The client 10 sends the request to the master metadata server 22 for metadata generation and deletion operation among the metadata servers in the metadata server cluster 20. The client 10 sends the request to any metadata server among a plurality of the slave metadata servers 24 for the metadata check operation. The client 10 inputs and outputs the desired data by accessing the relevant data server 30 through the metadata acquired from the process as mentioned above.

Figure 2:
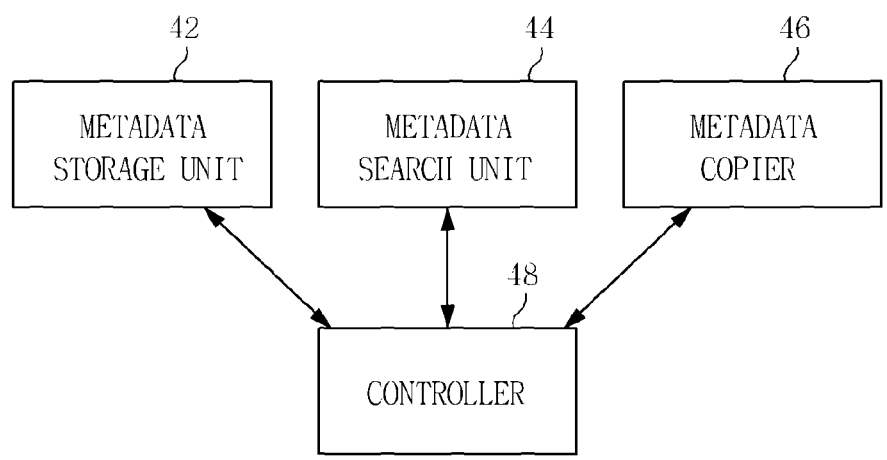
FIG. 2 is a diagram showing an inside configuration of a metadata server as depicted in FIG. 1.

FIG. 2 is a diagram showing an inside configuration of a metadata server as depicted in FIG. 1.

The master metadata server 22 and each slave metadata server 24 in FIG. 1 include a metadata storage unit 42 that stores a metadata, a metadata detector 44 for detecting a metadata, a metadata copier 46 that allows the metadata to copy to other metadata servers, and a controller 48 for controlling their operations.

Figure 3:
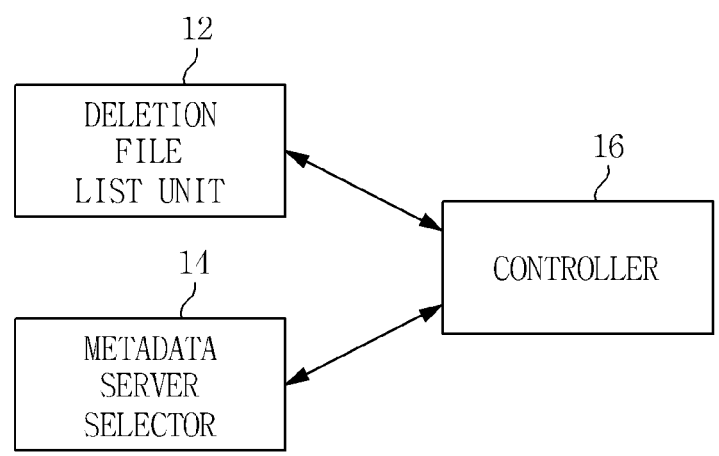
FIG. 3 is a block diagram illustrating a metadata access apparatus according to an exemplary embodiment of the present invention.

FIG. 3 is a block diagram illustrating a metadata access apparatus according to an exemplary embodiment of the present invention. An apparatus for accessing a metadata includes a deletion file list unit 12 that stores the information about the just deleted file during a predetermined period, a metadata server selector 14 that selects the specific metadata server among a plurality of metadata servers 22 and 24 to transmit question and answer (i.e., generation, deletion, access (check)) based on the information from the deletion file list unit 12, and a controller 16 for controlling the deletion file list unit 12 and the metadata server selector 14. The storage period in the deletion file list unit 12 is set up as the longer period than the copy period of the content of the master metadata server 22 to the slave metadata server 24. The storage period is dependent upon the number of slave metadata servers 24. However, the deleted metadata information exceeding the maximum predetermined storage period is preferably deleted from the deletion file list unit 12.

In this case, the apparatus for accessing the metadata as mentioned above may be the client 10 in FIG. 1.

Figure 4:
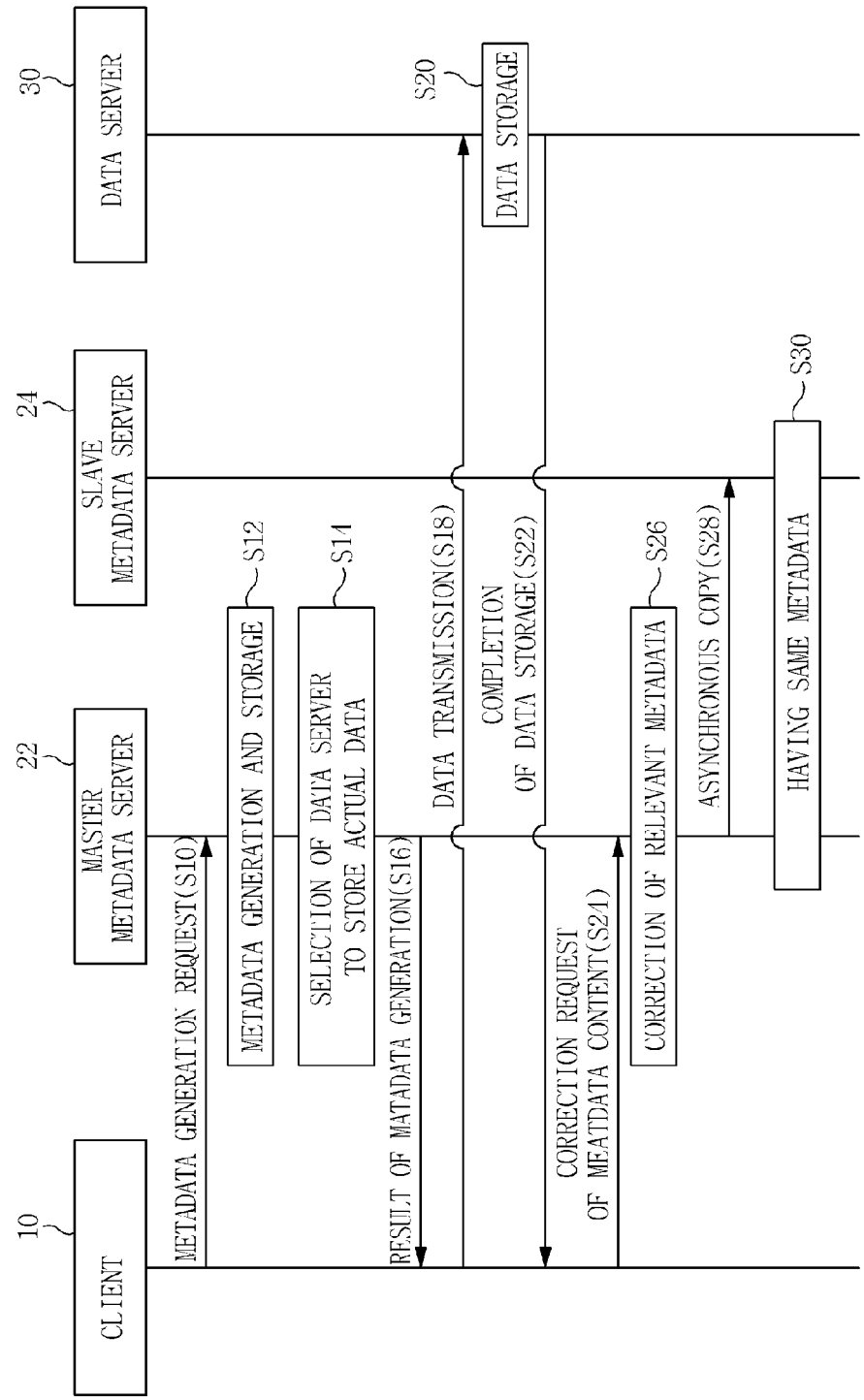
FIG. 4 is a flowchart showing the generation of the metadata that is applied to illustrate an exemplary embodiment of the present invention.

FIG. 4 is a flowchart showing the generation of the metadata that is applied to illustrate an exemplary embodiment of the present invention.

The client 10 transmits the request of the metadata generation to the master metadata server 22 (S10). In this process, determining the master metadata server 22 as a transmitting target of the request about the metadata generation is a role of the metadata server selector 14. In other words, the metadata server selector 14 in the client 10 determines the target to send the request of the metadata generation. As a result, the request of the metadata generation is transmitted to the master metadata server 22.

The master metadata server 22 that receives the request of the metadata generation from the client 10 generates the relevant metadata, and stores the generated metadata to the metadata storage unit 42 (S12). In this step, a file name of the relevant metadata is only generated and stored.

And, the master metadata server 22 that receives the request of the metadata generation from the client 10 selects the data server (i.e., one of a plurality of data servers 30) for storing the actual data (S14).

Then, the master metadata server 22 transmits the content (i.e., the result of the metadata generation) to the client 10 (S16).

The client 10 transmits the data to the specific data server (i.e., one of a plurality of data servers 30) based on the response that is received from the master metadata server 22. As a result, the relevant data servers 30 store the received data (S20).

If asking for information to the master metadata server 22, the desired data can be found through the metadata detector 44 in the master metadata server 22 because the metadata stored in the master metadata server 22 has information of the data server storing the actual data.

The data server 30 stored with the received data informs the data storage completion to the client 10 (S22).

Then, the client 10 requests the correction of the metadata content to the master metadata server 22 (S24). When the metadata is generated in the previous step S12, the file name of the relevant metadata is only generated, so that the request of the content correction is performed while the actual content (such as, the content for expressing data (location information, etc.)) of the metadata having a fixed file name is transmitted to the master metadata server 22.

The master metadata server 22 corrects the relevant metadata in the metadata storage unit 42 based on the actual content of the received metadata (S26).

And then, the master metadata server 22 starts to asynchronously copy so as to identically reflect the metadata just generated (i.e., the metadata that is completely corrected) to all the slave metadata servers 24 (S28).

Therefore, after a predetermined period, all the metadata servers 22 and 24 in the metadata server cluster 20 will have the same metadata (S30). An asynchronous copy step S28 is performed through a metadata copier 46 in each of the metadata servers 22 and 24. The asynchronous copy step can be performed in various ways. In other words, the master metadata server 22 can also copy to all the slave metadata servers 24. That is, it can be copied like the master metadata server 22 copies the metadata to the first slave metadata server, the first slave metadata server transmits the metadata to the next slave metadata server, and then the next slave metadata server transmits the metadata to the next after next slave metadata server.

From the complete point of the asynchronous copy, the desired data can be found even if the question and answer are performed to any of the metadata servers 22 and 24 in the metadata server cluster 20.

Figure 5:
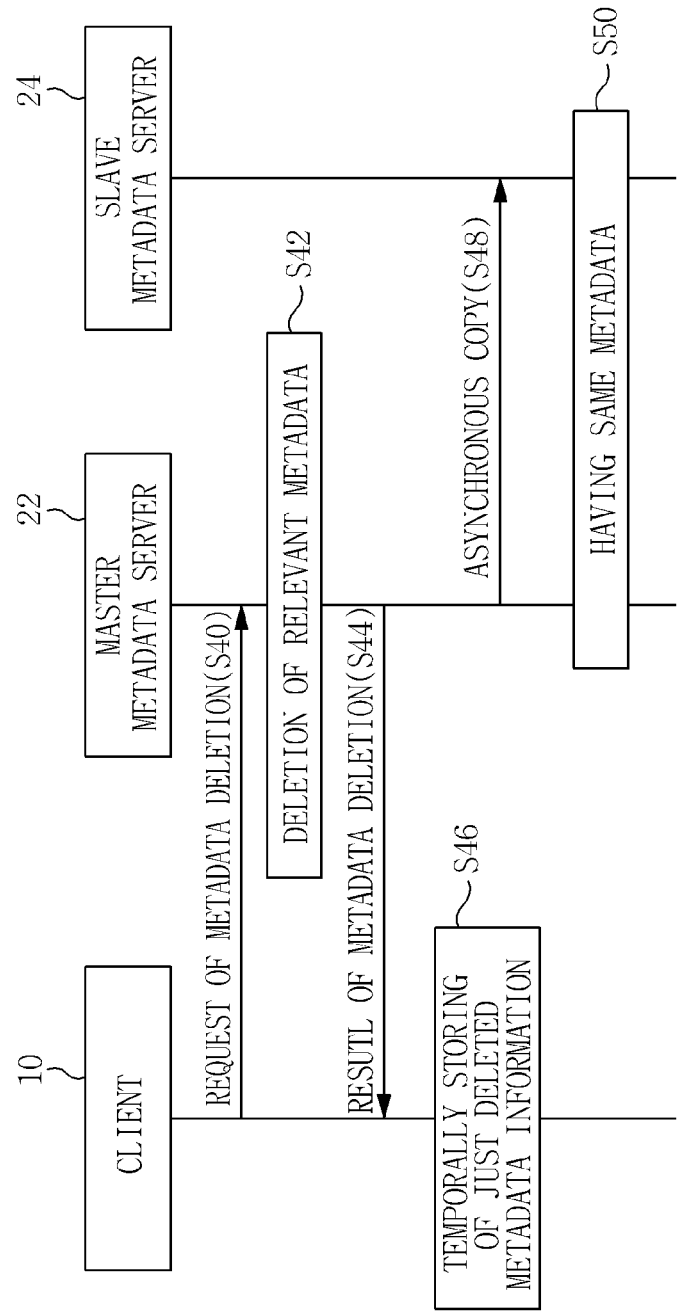
FIG. 5 is a flowchart showing the deletion of the metadata that is applied to illustrate an exemplary embodiment of the present invention.

FIG. 5 is a flowchart showing the deletion of the metadata that is applied to illustrate an exemplary embodiment of the present invention.

The client 10 requests the metadata deletion to the master metadata server 22 (S40). In step S40, determining the master metadata server 22 as a transmitting target of the request about the metadata deletion is a role of the metadata server selector 14. In other words, the metadata server selector 14 in the client 10 determines the target that transmits the request of the metadata deletion, and as a result, the request of the metadata deletion is transmitted to the master metadata server 22.

The master metadata server 22 receiving the request of the metadata deletion from the client 10 deletes the relevant metadata (S42). In step S42, the master metadata server 22 deletes the metadata through the metadata storage unit 42. The relevant data is deleted in the master metadata server 22, while the metadata is stored in the normal state in the other slave metadata server 24.

The master metadata server 22 transmits the response, in which the metadata is deleted, to the client 10 (S44).

The client 10 temporarily stores the just deleted metadata information in the deletion file list unit 12 (S46). In this time, the storage period is predetermined. The predetermined storage period is managed to be longer period than the period, which copies the content of the master metadata server 22 to all the slave metadata servers 24. The deletion metadata information in excess of the storage period will be removed from the deletion file list unit 12.

The master metadata server 22 starts to asynchronously copy so as to identically reflect the just deleted metadata to all the slave metadata servers 24 (S48).

The above-stated description operates orderly steps S46 and S48, but it is preferably understood that the two steps are performed nearly at the same time.

Therefore, after a predetermined period, the metadata in all of the metadata servers 22 and 24 in the metadata server cluster 20 are identically deleted and processed (S50). The process is performed through the metadata copier 46 in the metadata servers 22 and 24.

From the complete point of the asynchronous copy, it will be received that the relevant metadata does not exist, identically, even if the question and answer are performed to any of the metadata servers 22 and 24 in the metadata server cluster 20.

Figure 6:
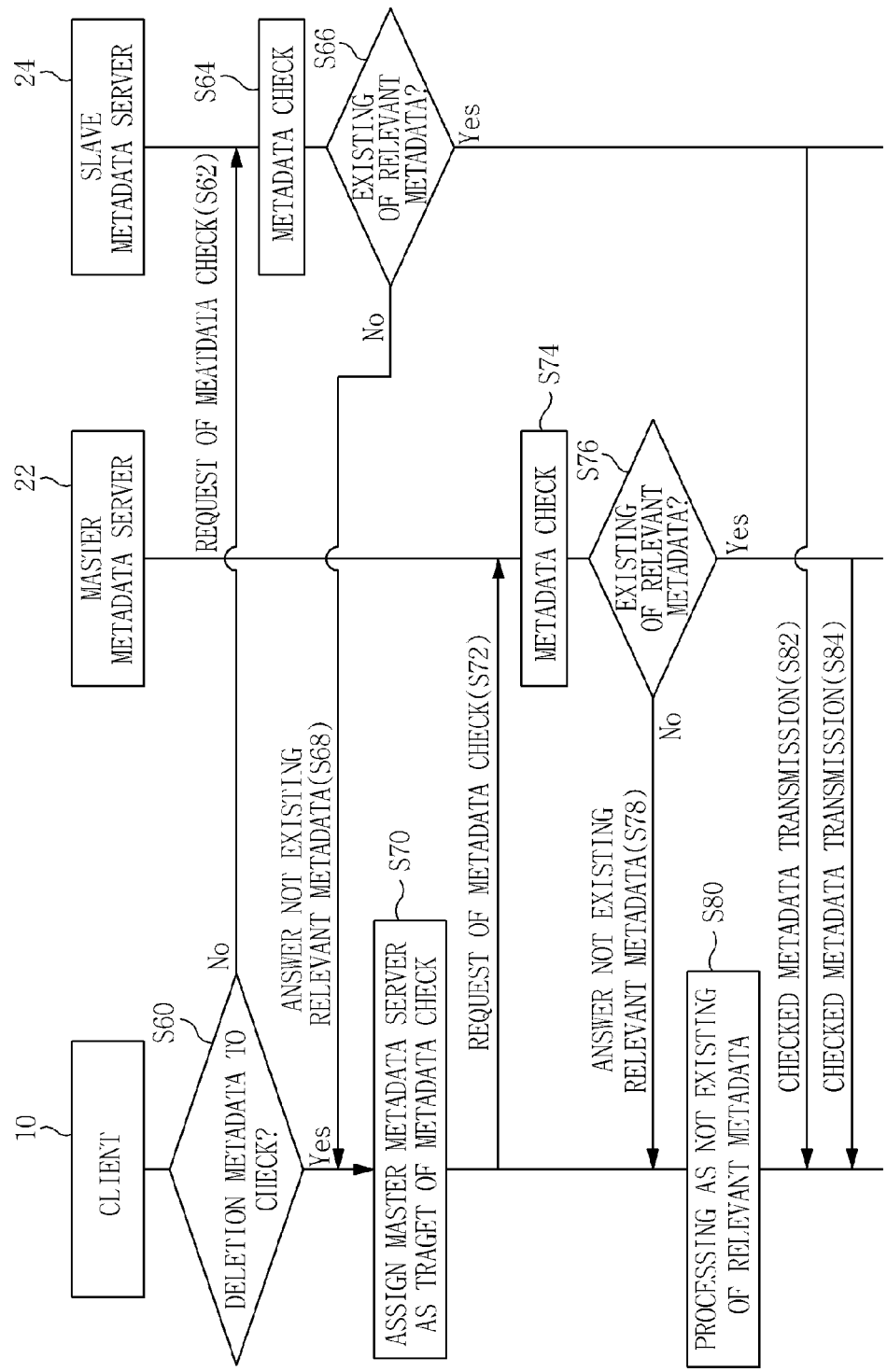
FIG. 6 is a flowchart showing the access (check) of the metadata according to an exemplary embodiment of the present invention.

FIG. 6 is a flowchart showing the access (check) of the metadata according to an exemplary embodiment of the present invention.

The client 10 determines whether or not the metadata to be now checked is deleted before the decision of the target metadata server to transmit the request of the metadata check (S60). The client 10 confirms the deletion of the metadata through the deletion file list unit 12.

If the metadata server selector 14 receives the response, in which the metadata to be now checked is not deleted from the deletion file list unit 12 ("No" in S60), the metadata server selector 14 assigns any slave metadata server 24 among a plurality of the slave metadata servers 24 as the target of the checked operation. And, the client 10 requests the metadata check operation to the selected slave metadata server 24.

As a result, the slave metadata server 24 receiving the metadata check operation performs the corresponded metadata check (S64).

If the desired metadata does not exist as a result of any selected slave metadata server 24 searching its metadata search unit 44 ("No" in S66), any selected slave metadata server 24 transmits the answer, in which the relevant metadata does not exist, to the client 10 (S68).

As a result, the metadata server selector 14 in the client 10 again assigns the master metadata server 22 as the target of the same metadata check operation (S70). Of course, in step S60, the client 10 processes to just the next step S70 and then performs the movement from the step when it is determined that the metadata to be now checked is deleted. In other words, the metadata server selector 14 again assigns the master metadata server 22 as the target of the metadata check operation if the answer, in which the metadata to be checked is deleted from the deletion file list unit 12 in the client 10, is received.

And, the client 10 requests once more the same metadata check operation to the master metadata server 22 (S72).

The master metadata server 22 performs the relevant metadata check according the check request (S74).

The metadata search unit 44 of the master metadata server 22 transmits the answer, in which the relevant metadata does not exist, to the client 10 (S78) if the metadata to be found does not exist in the metadata storage unit 42 ("No" in S76).

As a result, the client 10 is processed to not actually exist with the metadata (S80).

Meanwhile, in step S66, any selected slave metadata server 24 transmits the checked metadata to the client 10 (S82) if the metadata search unit 44 in any selected slave metadata server 24 finds the metadata to be checked in the metadata storage unit 42 ("Yes" in S66). Meanwhile, in step S76, the master metadata server 22 transmits the checked metadata to the client 10 (S84) if the metadata search unit 44 in the master metadata server 22 finds the metadata to be found in the metadata storage unit 42 ("Yes" in S76). As a result, the metadata exist, so that the client 10 processes the following operation, such as access to the data server disclosed in the metadata.

While the present invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. An apparatus for accessing a metadata, comprising:
   a deletion file list unit that stores information about a deleted metadata during a predetermined period following the metadata's deletion; and
   a metadata server selector that selects a metadata server from a plurality of metadata servers comprising a master metadata server and a plurality of slave metadata servers to receive an operation request that includes a metadata check request about a metadata, wherein the selected metadata server is selected based on the information from the deletion file list unit, wherein the metadata server selector selects the metadata server to receive the operation request according to whether or not the relevant metadata to be checked is deleted when requesting the metadata check, and wherein the metadata server selector selects the master metadata server and transmits the metadata check request when the relevant metadata is deleted.

2. The apparatus for accessing the metadata according to claim 1, wherein the predetermined period is longer than a period in which the information about the deleted metadata is shared to the plurality of the metadata servers.

3. The apparatus for accessing the metadata according to claim 1, wherein the metadata server selector selects one of the slave metadata servers and transmits the metadata check request when the relevant metadata is not deleted.

4. The apparatus for accessing the metadata according to claim 3, wherein the metadata server selector selects the master metadata server and transmits again the metadata check request when the answer, in which the relevant metadata does not exist, is received from the selected slave metadata server.

5. A method for accessing a metadata, comprising:
storing information about a deleted metadata in reference to a deletion file list unit during a predetermined period following the metadata's deletion; and
selecting a metadata server from a plurality of metadata servers comprising a master metadata server and a plurality of slave metadata servers to receive an operation request that includes a metadata check request about a metadata, wherein the selected metadata server is selected based on the information from the deletion file list unit, wherein the selecting the metadata server selects the metadata server to receive the operation request according to whether or not the relevant metadata to be checked is deleted when requesting the metadata check, and wherein the selecting the metadata server selects the master metadata server and transmits the metadata check request when the relevant metadata is deleted.

6. The method for accessing the metadata according to claim 5, wherein the predetermined period is longer than the period in which the information about the deleted metadata is shared with the plurality of metadata servers.

7. The method for accessing the metadata according to claim 5, wherein the selecting the metadata server selects any slave metadata server among the slave metadata servers and transmits the metadata check request when the relevant metadata is not deleted.

8. The method for accessing the metadata according to claim 7, wherein the selecting the metadata server selects the master metadata server and transmits again the metadata check request when the answer, in which the relevant metadata does not exist, is received from the selected slave metadata server.

* * * * *